United States Patent [19]
Woolley et al.

[11] Patent Number: 5,742,646
[45] Date of Patent: Apr. 21, 1998

[54] METHOD OF SELECTING AND SWITCHING SIGNAL PATHS IN A DIGITAL COMMUNICATION SYSTEM

[75] Inventors: Bradford Gillette Woolley, Palo Alto; Mehrali Parkhideh, Half Moon Bay, both of Calif.

[73] Assignee: Harris Corporation, Melbourne, Fla.

[21] Appl. No.: 435,873

[22] Filed: May 5, 1995

[51] Int. Cl.$^6$ ........................................ H04B 1/10
[52] U.S. Cl. ................................. 375/349; 375/347
[58] Field of Search .................................. 375/260, 349, 375/347, 267; 371/5.1; 455/135; 340/825.03

[56] References Cited

U.S. PATENT DOCUMENTS

| | | | |
|---|---|---|---|
| 4,395,772 | 7/1983 | Trested, Jr. | 375/267 |
| 4,530,087 | 7/1985 | Yamamoto | 375/347 |
| 4,891,812 | 1/1990 | Bocci et al. | 371/5.5 |
| 4,961,190 | 10/1990 | Nakajima | 371/5.1 |
| 5,329,555 | 7/1994 | Marko et al. | 375/347 |
| 5,430,769 | 7/1995 | Patsiokas et al. | 375/347 |
| 5,446,922 | 8/1995 | Siwiak et al. | 455/277.2 |
| 5,453,997 | 9/1995 | Roney, IV | 371/41 |
| 5,481,571 | 1/1996 | Balachandran et al. | 375/347 |
| 5,499,397 | 3/1996 | Wadin et al. | 375/347 |
| 5,513,185 | 4/1996 | Schmidt | 371/5.5 |
| 5,515,380 | 5/1996 | Giger | 371/2.1 |

*Primary Examiner*—Stephen Chin
*Assistant Examiner*—Betsy L. Deppe
*Attorney, Agent, or Firm*—Rogers & Killeen

[57] ABSTRACT

A method of switching from one signal path to another signal path in a digital communication system in which a digital signal is received in each of two signal paths, and the number of bits in error in the digital signal is estimated for each signal path for each of successive time periods by using a syndrome count available from a forward error correction algorithm before the digital signal is forward error corrected. If a predetermined bit error rate is exceeded in one of the signal paths in the time period, the corrected signal in other signal path is selected before the end of the time period. If the predetermined bit error rate is not exceeded by either of the first and second signal paths in the time period, the selected signal path may remain unchanged, or the signal path with the lowest number of estimated errors may be selected after the end of the time period.

13 Claims, 3 Drawing Sheets

| UN-CORRECTED | | MEASURED | | CORRECTED | | # ERRORS MADE BEFORE SWITICHING OCCURS |
|---|---|---|---|---|---|---|
| BER | ERRORS PER SEC | SYNDROMES PER SECOND MEASURED | mSec TO GET 8 SYNDROMES MEASURED | BER | ERRORS PER SEC | |
| 1.00E-12 | 1.55E-04 | 0 | 287,682,161 | 2.91E-30 | 4.50E-22 | 1.30E-13 |
| 1.78E-12 | 2.76E-04 | 0 | 167,524,057 | 1.49E-29 | 2.31E-21 | 3.87E-13 |
| 3.16E-12 | 4.90E-04 | 0 | 97,553,180 | 7.66E-29 | 1.19E-20 | 1.16E-12 |
| 5.62E-12 | 8.72E-04 | 0 | 56,807,501 | 3.93E-28 | 6.10E-20 | 3.46E-12 |
| 1.00E-11 | 1.55E-03 | 0 | 33,080,338 | 2.02E-27 | 3.13E-19 | 1.04E-11 |
| 1.78E-11 | 2.76E-03 | 0 | 19,263,455 | 1.04E-26 | 1.61E-18 | 3.10E-11 |
| 3.16E-11 | 4.90E-03 | 0 | 11,217,561 | 5.32E-26 | 8.25E-18 | 9.26E-11 |
| 5.62E-11 | 8.72E-03 | 0 | 6,532,248 | 2.73E-25 | 4.24E-17 | 2.77E-10 |
| 1.00E-10 | 1.55E-02 | 0 | 3,803,881 | 1.40E-24 | 2.18E-16 | 8.28E-10 |
| 1.78E-10 | 2.76E-02 | 0 | 2,215,089 | 7.21E-24 | 1.12E-15 | 2.47E-09 |
| 3.16E-10 | 4.90E-02 | 0 | 1,289,898 | 3.70E-23 | 5.74E-15 | 7.40E-09 |
| 5.62E-10 | 8.72E-02 | 0 | 751,138 | 1.90E-22 | 2.95E-14 | 2.21E-08 |
| 1.00E-09 | 1.55E-01 | 0 | 437,405 | 9.76E-22 | 1.51E-13 | 6.61E-08 |
| 1.78E-09 | 2.76E-01 | 0 | 254,711 | 5.01E-21 | 7.76E-13 | 1.98E-07 |
| 3.16E-09 | 4.90E-01 | 0.1 | 148,324 | 2.57E-20 | 3.99E-12 | 5.91E-07 |
| 5.62E-09 | 8.72E-01 | 0.1 | 86,373 | 1.32E-19 | 2.05E-11 | 1.77E-06 |
| 1.00E-08 | 1.55E+00 | 0.2 | 50,297 | 6.78E-19 | 1.05E-10 | 5.29E-06 |
| 1.78E-08 | 2.76E+00 | 0.3 | 29,289 | 3.48E-18 | 5.40E-10 | 1.58E-05 |
| 3.16E-08 | 4.90E+00 | 0.5 | 17,056 | 1.79E-17 | 2.77E-09 | 4.73E-05 |
| 5.62E-08 | 8.72E+00 | 0.8 | 9,932 | 9.18E-17 | 1.42E-08 | 1.41E-04 |
| 1.00E-07 | 1.55E+01 | 1.4 | 5,784 | 4.71E-16 | 7.31E-08 | 0.000 |
| 1.78E-07 | 2.76E+01 | 2.4 | 3,368 | 2.42E-15 | 3.75E-07 | 0.001 |
| 3.16E-07 | 4.90E+01 | 4.1 | 1,961 | 1.24E-14 | 1.93E-06 | 0.004 |
| 5.62E-07 | 8.72E+01 | 7.0 | 1,142 | 6.38E-14 | BAND 1 9.89E-06 | 0.01 |
| 1.00E-06 | 1.55E+02 | 12.0 | 665 | 3.28E-13 | 5.08E-05 | 0.03 |
| 1.78E-06 | 2.76E+02 | 20.7 | 387 | 1.68E-12 | 2.61E-04 | 0.1 |
| 3.16E-06 | 4.90E+02 | 35.5 | 226 | 8.64E-12 | 1.34E-03 | 0.3 |
| 5.62E-06 | 8.72E+02 | 60.9 | 131 | 4.43E-11 | BAND 2 6.87E-03 | 0.9 |
| 1.00E-05 | 1.55E+03 | 105 | 76.5 | 2.28E-10 | 3.53E-02 | 2.7 |
| 1.78E-05 | 2.76E+03 | 180 | 44.5 | 1.17E-09 | 1.81E-01 | 8.1 |
| 3.16E-05 | 4.90E+03 | 308 | 25.9 | 6.00E-09 | 9.31E-01 | 24 |
| 5.62E-05 | 8.72E+03 | 530 | 15.1 | 3.08E-08 | 4.78E+00 | 72 |
| 1.00E-04 | 1.55E+04 | 910 | 8.8 | 1.58E-07 | 2.45E+01 | 216 |
| 1.78E-04 | 2.76E+04 | 1,562 | 5.1 | 8.13E-07 | BAND 3 1.26E+02 | 645 |
| 3.16E-04 | 4.90E+04 | 2,683 | 3.0 | 4.17E-06 | 6.47E+02 | 1,929 |
| 5.62E-04 | 8.72E+04 | 4,607 | 1.7 | 2.14E-05 | 3.32E+03 | 5,766 |
| 1.00E-03 | 1.55E+05 | 7,912 | 1.0 | 1.10E-04 | 1.71E+04 | 17,242 |
| 1.78E-03 | 2.76E+05 | 13,586 | 0.6 | 5.65E-04 | 8.76E+04 | 51,552 |
| 3.16E-03 | 4.90E+05 | 23,331 | 0.3 | 2.90E-03 | 4.50E+05 | 154,140 |
| 5.62E-03 | 8.72E+05 | 40,066 | 0.2 | 1.49E-02 | 2.31E+06 | 460,878 |
| 1.00E-02 | 1.55E+06 | 68,803 | 0.1 | 7.65E-02 | 1.19E+07 | 1,378,019 |

*FIG. 2*

ND OF SWITCHING
SIGNAL PATHS IN A DIGITAL
COMMUNICATION SYSTEM

BACKGROUND OF THE INVENTION

The present invention relates to digital communications systems, and more particularly to a method of switching from one signal path to another signal path to improve reception of a digital signal.

Transmission systems, especially microwave systems, are frequently used to communicate digital information. In such systems it is highly desirable to reduce the number of bit errors in the received signal by improving the bit error rate (BER). To this end the systems are typically provided with an error correction scheme that may improve the BER. Further, the systems may be provided with redundant features so that a digital signal may be communicated to a receiving station in more than one signal path. For example, a system may include separate filters, antennas, and/or receivers for receiving signals in different signal paths.

In the operation of multi-path systems, the path with the best BER may be determined and the signal from the selected path provided for forward error correction. However, the method of selecting and switching from one signal path to another may inject errors, and it is highly desirable to provide a switching system that is errorless.

Accordingly, it is an object of the present invention to provide a novel method of switching a digital signal from one signal path to another that obviates the problems of the prior art.

It is another object of the present invention to provide a novel method of switching a digital signal from one signal path to another in which uncorrected BERs of two signal paths are estimated and compared, and in which the error corrected signal in the better signal path is provided for output.

It is yet another object of the present invention to provide a novel method of switching a digital signal from one signal path to another in which BERs of two signal paths are estimated for a time period by using a syndrome count available from the FEC algorithm before a signal is forward error corrected.

It is still another object of the present invention to provide a novel method of switching a digital signal from one signal path to another in which syndrome counts from the signal paths are compared and the selected signal path is immediately deselected if the syndrome count for the selected signal path indicates that a predetermined BER is to be exceeded.

It is a further object of the present invention to provide a novel method of switching a digital signal from one signal path to another in which syndrome counts from the signal paths are compared and the selected signal path is not changed if the syndrome count for the selected signal path indicates that a predetermined BER is not exceeded.

It is still a further object of the present invention to provide a novel method of switching a digital signal from one signal path to another in which BERs of two signal paths are estimated for a time period and compared, and in which the signal is switched to an unselected signal path after the end of the time period if the estimated number of bit errors in the selected signal path exceeds the estimated number of errors in the unselected signal path by a predetermined amount.

These and many other objects and advantages of the present invention will be readily apparent to one skilled in the art to which the invention pertains from a perusal of the claims, the appended drawings, and the following detailed description of the preferred embodiments.

As used herein, an errorless switching method is one in which a signal is switched from one signal path to another without error, or with such a small number of errors that the error rate is indistinguishable from errorless to the receiving system of interest.

An error correcting algorithm is a method of coding information so that a recipient can recognize and remove a certain number of errors. The number of errors removed is a function of the capability of the error correcting algorithm and the received BER (e.g., proportionally more errors may be removed from a signal with a low BER than from a signal with a high BER). Forward error correction (FEC) is an error correcting algorithm that corrects errors in a signal before the signal is decoded.

BRIEF DESCRIPTION OF THE DRAWINGS

FIG. 2 is a table of corrected and uncorrected BERs.

DESCRIPTION OF PREFERRED EMBODIMENTS

The method of the present invention may provide errorless switching from one signal path to another signal path in a digital communication system. A digital signal may be received in each of two signal paths, and the number of bits in error in the digital signal may be estimated for each signal path for each of successive time periods. The estimated number of errors may be derived from a conventional FEC algorithm in an advance output of pulses known as a syndrome count. (Methods for deriving the syndrome count are known, and the syndrome count may not always appear as pulses. The reference to pulses herein includes other manifestations of syndrome count available from FEC algorithms.) The syndrome count is available from the FEC algorithm before the input signal is forward error corrected by the algorithm, and is an early indication of the number of bit errors that have been sensed in a predetermined time period. The input signal in each signal path is provided to a FEC algorithm and is forward error corrected after the syndrome count is provided. Thus, each signal path is forward error corrected and a corrected signal is available for each path.

If the estimated number of errors for a signal path indicates that more than a predetermined number of bits in error would be received in the time period, the error corrected signal from the other signal path is selected before the end of the time period. In the event the predetermined number of bits in error is not exceeded by either of the first and second signal paths in the time period, the signal path desirably remains unchanged, although the signal path with the lowest number of estimated errors may be selected after the end of the time period if its error count is less than the other signal path by a predetermined amount.

Figure 1:
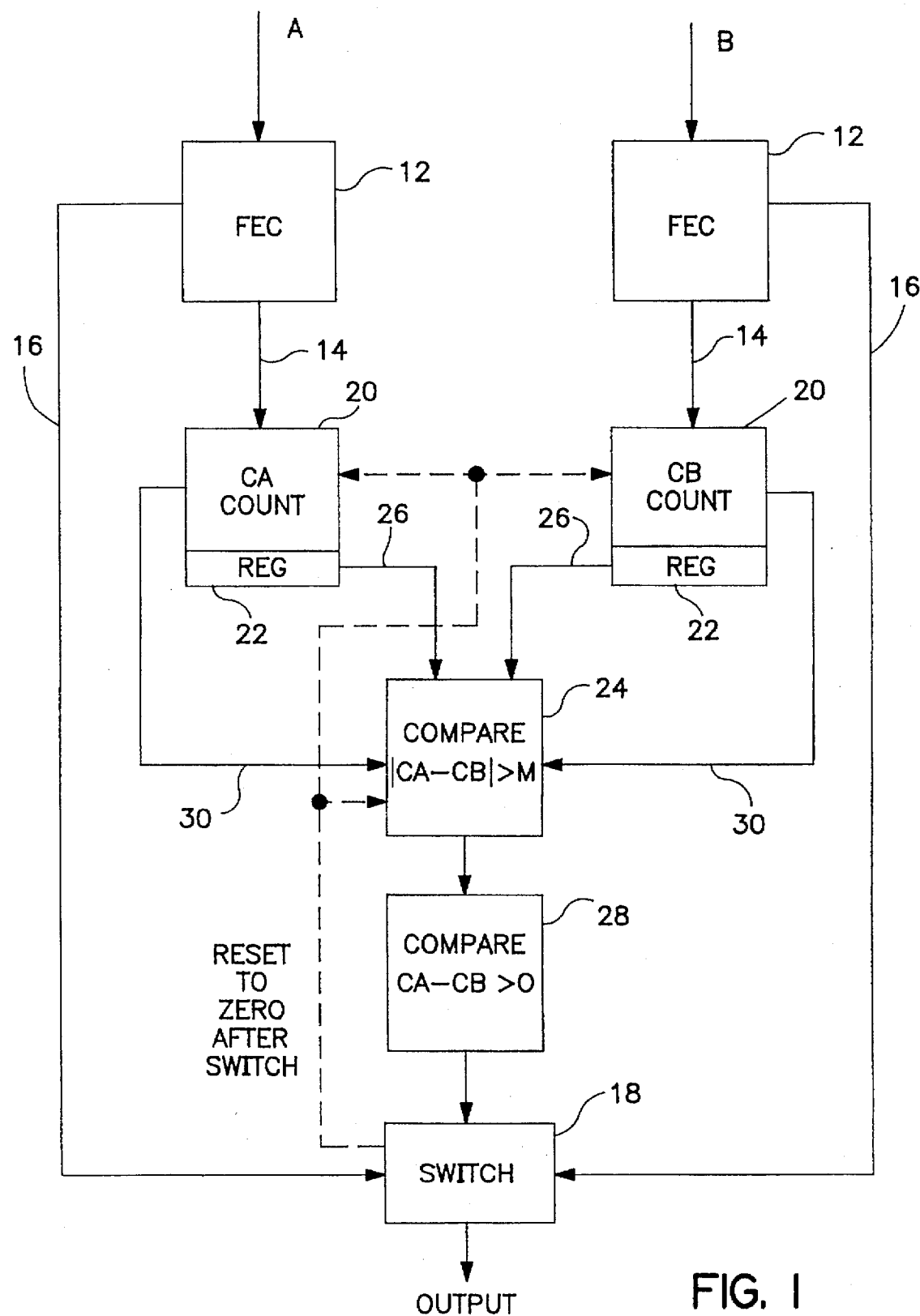
FIG. 1 is a flow diagram of operation of an embodiment of the method of the present invention.

With reference now to FIG. 1, in an embodiment 10 of the method of the present invention, each signal path A and B may have a conventional error correction algorithm 12 for providing a syndrome count 14 and subsequently providing a forward error corrected signal 16. Conventional error correcting algorithms estimate the number of bit errors occurring prior to forward error correction in selectable windows of time, such as one millisecond, ten milliseconds or one second. Each error corrected signal 16 may be provided to a conventional errorless switch 18 (a switch that does not introduce detectable errors when switching from one signal path to another). The errorless switch 18 may be operated in response to a comparison of the estimated number of errors in the uncorrected signals (the syndrome count) in signal paths A and B.

The syndrome count 14 for a signal path may be provided in the form of bits to counter 20 for maintaining a tally of the errors indicated by the syndrome count (each bit representing one errored event). The counter 20 may include a register 22 having a predetermined number of spaces for bits (e.g., a ten bit register). The size of the register may be selected to be the same as the desired maximum number of acceptable errors in a predetermined time period. The syndrome count for each signal path CA and CB may be determined for each predetermined time period. In a preferred embodiment the predetermined time period is ten milliseconds, although other periods may be used. The maximum number of acceptable errors in the predetermined time period and thus the size of register 22 may be derived from an acceptable bit error rate after forward error correction (as will be discussed further in relation to FIG. 2.)

The counters 20 may provide two inputs to a comparator 24 for comparing the number of errors and providing a signal to the switch 18 when a new signal path is to be selected. The first input may be an overflow signal 26 directing the switch 18 to select another signal path immediately. The second input may be a bit count signal 30 that is provided each time a syndrome count bit is provided to the counter 20. The comparator 24 may keep a running tally of the difference between the number of errors in one path compared to another path. So long as the number of errors in each predetermined time period is acceptable, the estimated number of errors may be accumulated in comparator 24 until the difference between the number of errors in one path, CA, exceeds the number of errors in another path, CB, by a predetermined amount M, at which time the signal path may be switched. That is, until $$|CA-CB|>M$$

The overflow signal 26 may be provided if the register 22 overflows during a predetermined time period (in the example above, if more than 10 syndrome count bits are received in ten milliseconds). To prevent a switch to a channel with a worse error rate, a further comparator 28 may be provided that ensures that the count of the overflow signal path is greater than that of the other path (e.g., CA−CB>0).

The comparison of equation (1) may be made periodically, such as each 500 milliseconds. Once the signal path is switched, due to overflow signal 26 or to an accumulated difference, the counters 20 and comparator 24 may be reset to zero. The size of M may be selected to avoid excess switching, and is desirably larger than zero. Alternatively, the comparison of equation (1) may be made at the end of each predetermined time period.

In the selection of the parameters used in the method, consideration may be given to the ability of the FEC algorithm to provide to timely information (how much warning from the syndrome count is available), the error rate at which the algorithm fails to produce results that are seen as errorless by the receiving system, and how many errors can be tolerated over what period of time.

The operation of the method may be more clearly understood as covering three performance bands. The first band is one in which the number of errors in the signal paths is so small that the result may be considered errorless regardless of which path is selected. There is no hurry to Switch. In the second band, some errors are seen in some signal paths so that a switch is appropriate as soon as possible. In the third band, the error rate is so high that an immediate switch is required.

Figure 3:
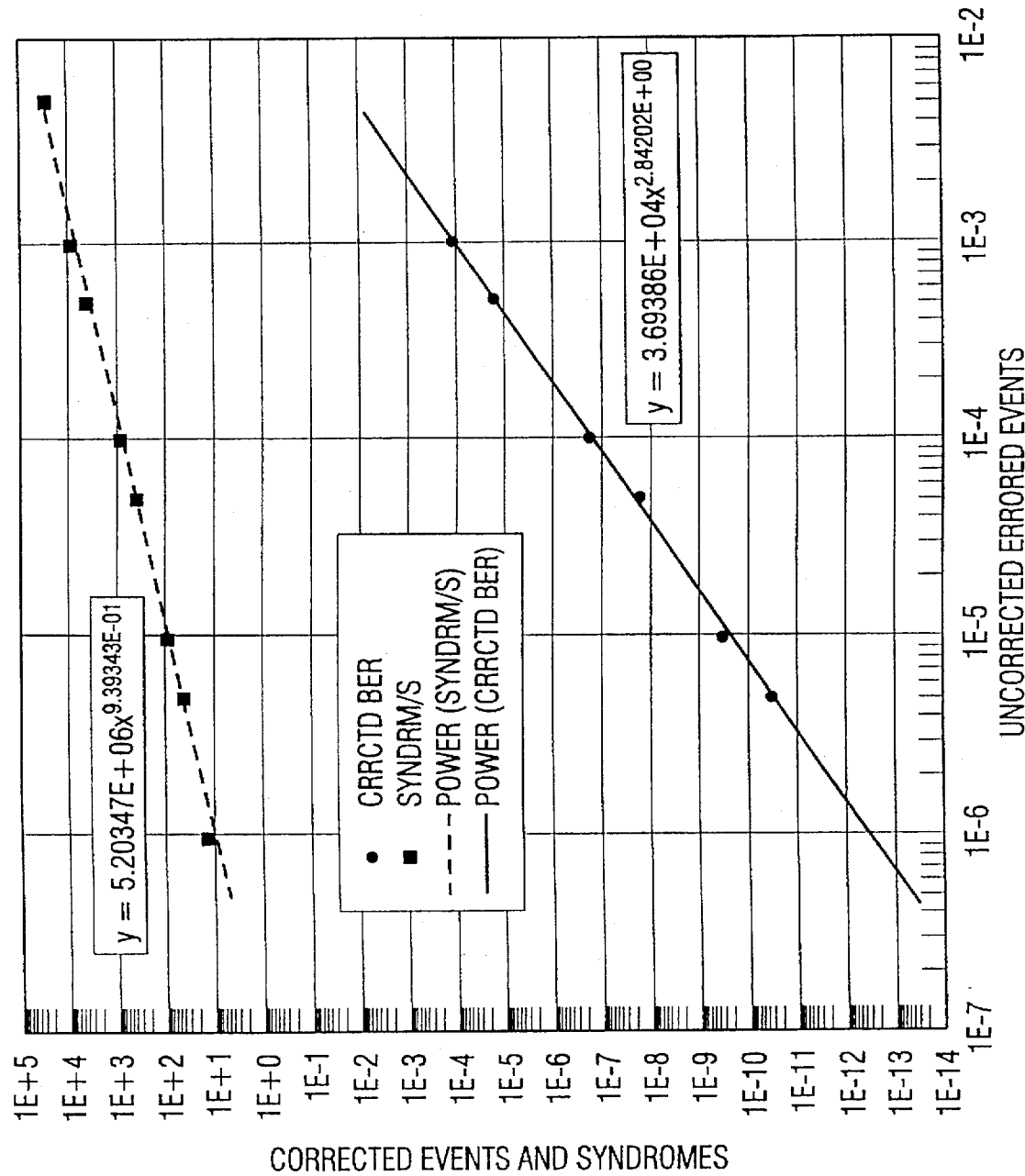
FIG. 3 is a graphical depiction of measured results.

By way of example, and with reference to FIG. 2, a received signal may have the uncorrected BERs indicated in the first column. Errors per second are shown in the second column. The number of errors per second may be divided by N if needed to prevent overload of the counter 20 (N is 32 in the example of FIG. 2). The number of milliseconds required to reach M is indicated in the fourth column (M is 8 in the example of FIG. 2). A conventional CSOC forward error correction algorithm provides the corrected BERs and errors per second indicated in fifth and sixth columns. Examples of the performance bands discussed above are indicated. As an example of the slow operation in band 1, note that at for an uncorrected BER of 1.0E-07, the switch from one signal path to another may take place after about 5.8 seconds. A graph of measured results is shown in FIG. 3.

The references herein to two signal paths are provided to facilitate an understanding of the invention and are not intended to limit the invention to only two signal paths. The invention is applicable to any number of plural signal paths.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of switching from one signal path to another signal path in a digital communication system, the method comprising the steps of:

(a) receiving a digital signal in a first signal path in a communication system;

(b) receiving the digital signal in a second signal path in the communication system;

(c) estimating the number of bits in error in the digital signal received in each of the first signal path and the second signal path during a predetermined time period before providing the digital signal for forward error correction,
  wherein at least a predetermined number of bits would be received in error in the predetermined time period if a first bit error rate were exceeded;

(d) in the event the first bit error rate is not exceeded in signals in either of the first and second signal paths in the predetermined time period, comparing the number of estimated bits in error in the two signal paths after the end of the predetermined time period, and
  indicating to a switch for selecting one of the two signal paths that the signal path with the lower number of estimated bits in error is to be selected; and (e) in the event the first bit error rate is exceeded in a signal in one of the first and second signal paths during the predetermined time period, indicating to the switch that the signal path with the signal with the lower number of bits in error is to be selected before the end of the predetermined time period.

2. The method of claim 1 wherein the indication to the switch to select the signal path with the lower number of estimated bits in error in step (d) is made when the signal path with the lower number of estimated bits in error has fewer than one-tenth the number of estimated bits in error than the other signal path.

3. The method of claim 1 wherein the predetermined time period is ten milliseconds.

4. The method of claim 1 further comprising the step of providing the digital signal from the selected signal path for forward error correction.

5. The method of claim 1 wherein the first error rate is an estimated corrected bit error rate after forward error correction.

6. A method of switching from one signal path to another signal path in a digital communication system comprising the steps of:

(a) receiving a digital signal in each of two signal paths;

(b) estimating the number of bits in error in the digital signal for each signal path for a time period before the signal is forward error corrected;

(c) selecting one signal path before the end of the time period if more than a predetermined number of bits in error is estimated for the other signal path within the time period; and (d) selecting one signal path after the end of the time period if the one signal path has fewer estimated errors than the other signal path.

7. The method of claim 6 wherein the step of selecting after the end of the time period is carried out when the signal path with the lower number of estimated bits in error has fewer than one-tenth the number of estimated bits in error than the other signal path.

8. The method of claim 6 wherein the time period is between one millisecond and one second in length.

9. The method of claim 6 further comprising the step of providing the digital signal from the selected signal path for forward error correction.

10. The method of claim 6 wherein the step of estimating the number of bits in error for each signal path comprises the step of using a syndrome count from a forward error correction algorithm to estimate the number of bits in error.

11. The method of claim 6 wherein the step of selecting one signal path after the end of the time period comprises the steps of accumulating the estimated number of bits in error in the digital signal for each signal path and selecting the one signal path which has the lowest accumulated bits in error when the difference between the accumulated bits in error for the two paths exceeds a predetermined amount.

12. The method of claim 1 wherein the step of estimating the number of bits in error in the digital signal received in each of the first signal path and the second signal path comprises the step of using a syndrome count from a forward error correction algorithm to estimate the number of bits in error.

13. The method of claim 1 wherein step (d) further comprises the steps of accumulating the estimated number of bits in error in the digital signal for each signal path and indicating to the switch to select the one signal path which has the lowest accumulated bits in error when the difference between the accumulated bits in error for the two paths exceeds a predetermined amount.

* * * * *